Jan. 23, 1934.  F. A. PARSONS  1,944,455
MACHINE TOOL TRANSMISSION AND CONTROL MECHANISM
Filed Feb. 17, 1926    9 Sheets-Sheet 4

Fig. 5

INVENTOR
Fred A. Parsons

Jan. 23, 1934.   F. A. PARSONS   1,944,455
MACHINE TOOL TRANSMISSION AND CONTROL MECHANISM
Filed Feb. 17, 1926   9 Sheets-Sheet 6

INVENTOR
Fred A. Parsons

INVENTOR
Fred G. Parsons

Jan. 23, 1934.  F. A. PARSONS  1,944,455

MACHINE TOOL TRANSMISSION AND CONTROL MECHANISM

Filed Feb. 17, 1926  9 Sheets-Sheet 8

INVENTOR
Fred A Parsons

Patented Jan. 23, 1934

1,944,455

UNITED STATES PATENT OFFICE 1,944,455

MACHINE TOOL TRANSMISSION AND CONTROL MECHANISM

Fred A. Parsons, Milwaukee, Wis., assignor to Kearney & Trecker Corporation, West Allis, Wis.

Application February 17, 1926. Serial No. 88,806

32 Claims. (Cl. 90—21)

This invention relates more particularly to transmission mechanism and control mechanism therefor, for machine tools, in which there is relative movement between the work and the cutting tool in two or more paths.

In such machines it is ordinarily true that there is a main or most used path of movement, the others being secondary in importance or use, and a purpose of this invention is to provide a maximum of convenience in the use of the main or most used path while maintaining a sufficient convenience with less complicated transmission and control mechanism in another path or paths.

It is also ordinarily true in such machines that the different paths of movement present different conditions in operation of the machine, either the weight of machine parts to be moved, or in the length of travel or both combined, and to these differences are added the previously mentioned differences of use in different paths. It is a further purpose of this invention to provide for each of the above mentioned differences and for all of them in combination, by the means of an improved and simplified transmission and control mechanism.

A further purpose relates to the simplification and improvement of the construction and operation of the transmission and control mechanism of machine tools, generally, and of a particular type of machine tool, namely milling machines, a machine of this type having been used to illustrate the invention both in its broad and narrow aspects.

It is a further purpose to improve upon the milling machine transmission and control mechanism shown in my previous patents relating to similar subject matter, namely United States Patents 1,270,862, issued July 2, 1918, and 1,718,067 issued June 18, 1929, and reissued as Number 17,734 on July 15, 1930.

Still other purposes will be apparent from this disclosure to those who are familiar with the machine tool art.

The invention consists in the novel features of construction and peculiar arrangement and combination of parts as hereinafter described and as particularly pointed out in the accompanying claims.

In the drawings same reference characters have been used to designate the same parts in each of the various views.

A column or stationary support 1 is provided with a knee or vertically movable support 2 which is guided on the front column wall. The upper face of the knee 2 is provided with ways upon which a saddle or support 3 is slidable toward and from column 1, and slidably guided for longitudinal movement on saddle 3 is a table or support 4. The several supports together provide for movement of table 4 and work supported therefrom in three transverse paths or directions.

The column 1 supports a spindle and transmission mechanism which is the same as in my co-pending application, resulting in Patent 1,718,067 above referred to.

For power movement in each path, that is to say for the movement of the knee, saddle and table, transmission mechanism is provided certain portions of which are common to all supports, other portions individual to certain supports, while still other portions are common to two only of the three movable supports, all of which will now be described.

Figure 1:
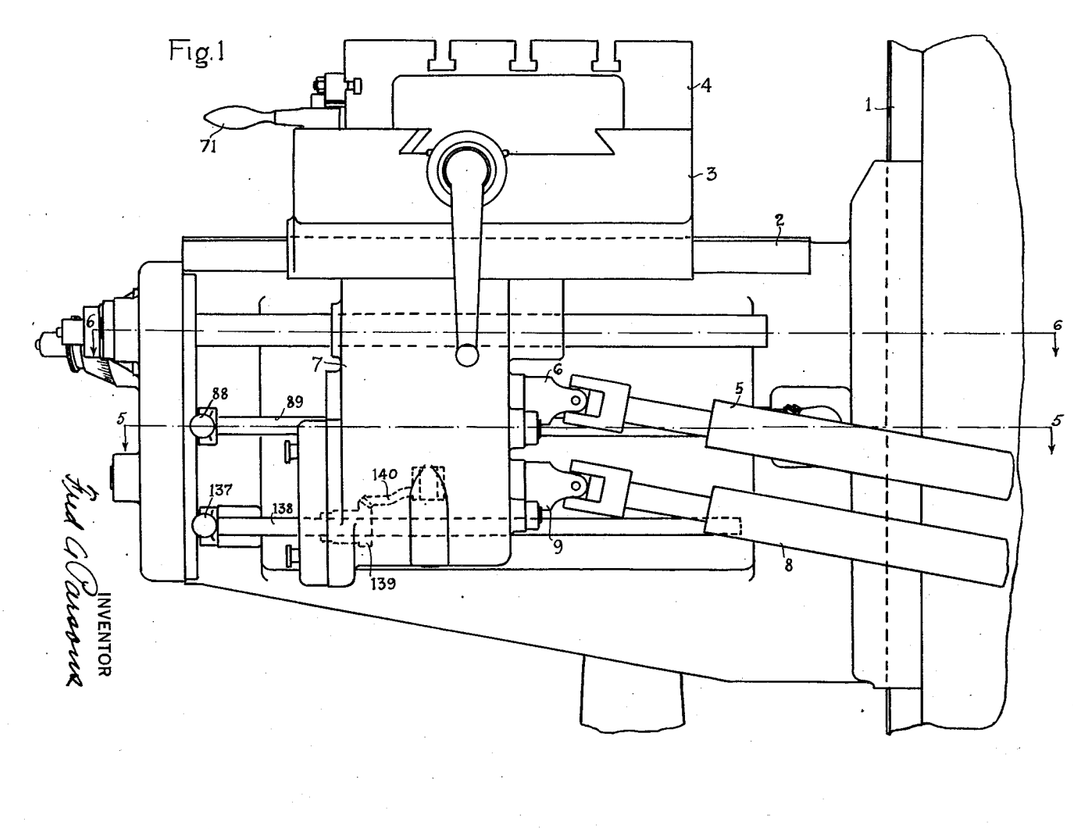
Fig. 1 illustrates a portion of a milling machine which embodies this invention, the view being taken from the right. The machine here shown is of the type commonly known as a knee and column milling machine and some portions which are unnecessary to illustrate the invention have been omitted.
Figure 12:
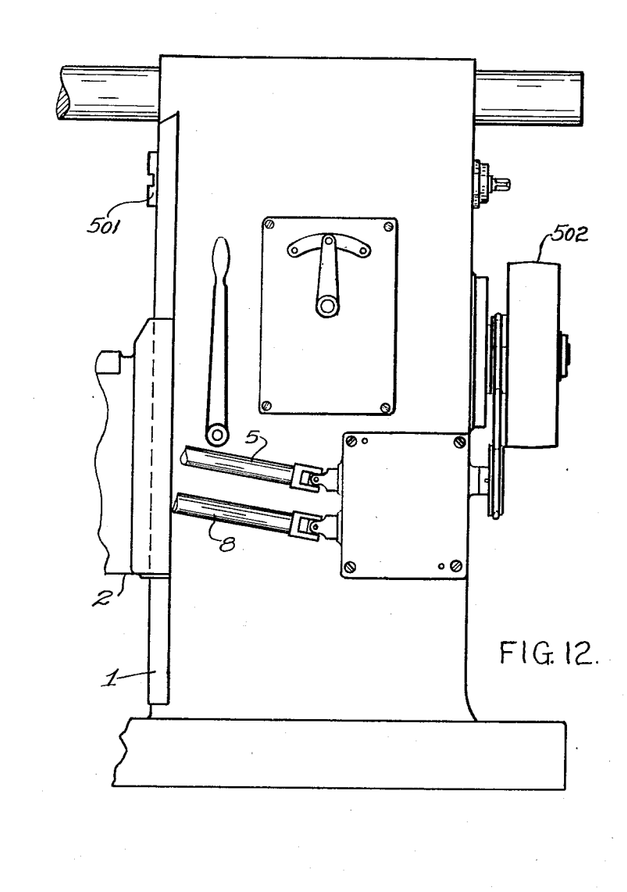
Fig. 12 is a partial side view, showing the column portion of the machine.
Figure 13:
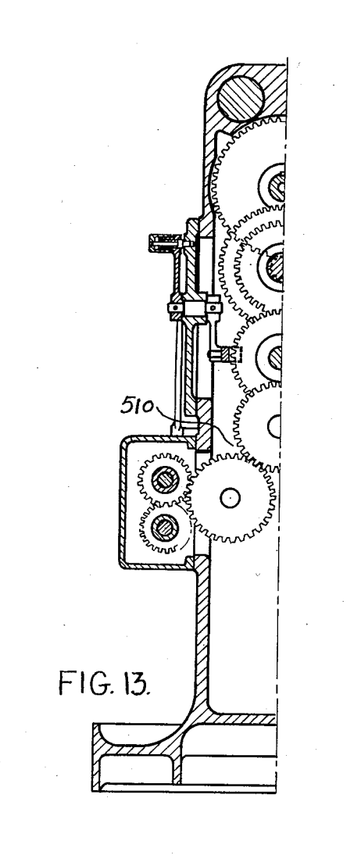
Fig. 13 is a diagrammatic showing of the driving trains and a part of the control mechanism.

By the means of an extensible universal joint shaft of well known construction, indicated at 5, Figs. 1 and 12, power is transmitted from pulley 502, to a rapid traverse drive member 6 rotatably supported from a box or housing 7 fixed on saddle 3, at a constant rapid traverse rate. The shaft 5 is driven similarly to the corresponding shaft of the Patent 1,718,067 previously referred to.

Figure 14:
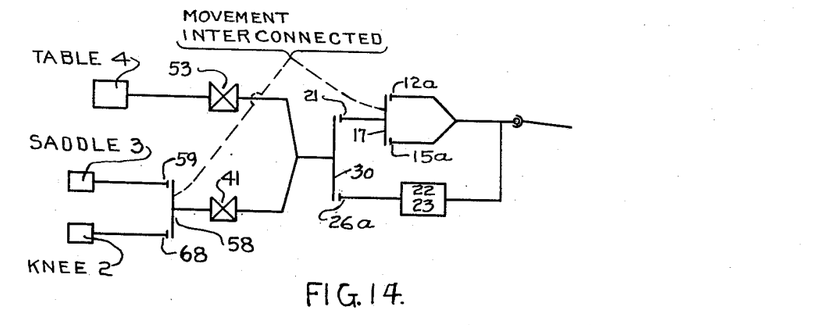
Fig. 14 is a similar partial diagram of an alternative arrangement.

By the means of a similar universal joint shaft, indicated at 8, Figs. 1 and 12, feed movement is transmitted to a feed drive member 9 likewise rotatably supported from housing 7. The members 9 and 6 may be connected by suitable gearing as diagrammatically indicated, Fig. 14 to be driven from a single joint shaft, if desired, but preferably separate joint shafts are used and shaft 8 is driven similarly to the corresponding shaft in the Patent 1,718,067 previously referred to.

The rapid traverse drive member 6 is fixed on a shaft 10 (see Figs. 7 and 10) for rotation therewith. Fixed on or integral with shaft 10 is a pinion 11 meshing with a gear 12 supported by but rotatable on a shaft 13. Fixed on shaft 10 is a gear 14 meshing with a gear 15 supported by but rotatable upon shaft 13. The gear pairs 11—12 and 14—15 are of materially different ratio whereby gears 12 and 15 are driven at materially different speeds from the constant speed shaft 10. Slidably keyed on a sleeve 16 fixed on shaft 13 intermediate between gears 12 and 15 is a clutch member 17 provided with clutch teeth 17a, 17b, on its end faces. Fixed with the gears 12 and 15 are clutch members 12a and 15a provided with clutch teeth complementary to the clutch teeth of the clutch member 17. The clutch member 17 may be axially shifted in either direction to engage the one or the other of the complementary clutch teeth whereby the speed of the gears 12 or 15 will be selectively transmitted to shaft 13. Fixed on shaft 13 is a gear 18 meshing with a gear 19 supported by but rotatable on a shaft 20. Fixed with the gear 19 is a rapid traverse clutch member 21 provided with end clutch teeth 21a.

The mechanism connecting shaft 10 with clutch member 12a constitutes a relatively slow rapid traverse train, while the mechanism connecting shaft 10 with clutch member 15a constitutes a relatively fast rapid traverse train. Either of these are selectively available for actuating clutch member 21, by shifting clutch member 17 in the one or the other direction, the member 17 thus constituting a device shiftable to produce different rapid traverse rates, and together with the driving mechanism constituting a speed change mechanism, effective on the rapid traverse clutch member 21.

The feed drive member 9 is fixed on shaft 20 at the opposite end of which pinion 22 is removably keyed to mesh with a gear 23 which is removably keyed to shaft 24, upon which is fixed a pinion 25 engaging a gear 26 supported by but rotatable on shaft 20 and having fixed for rotation therewith a feed clutch member 26a. The ends of shaft 20 and 24 upon which the gears 22 and 23 are removably mounted are similar to permit the gears 22 and 23 to be interchanged thereon, and the gears being of different diameter, such an interchange will result in a different feed rate being transmitted to the gear 26. The interchangeable gears 22 and 23 thus constitute a rate changer and a variety of other gear pairs are ordinarily supplied to be used interchangeably with the gears 22 and 23, such gear pairs being also interchangeable upon the shaft ends whereby a great variety of feed rates may be transmitted to the feed clutch member 26a in accordance with the setting of the rate changer.

The rate changer just described being supported from saddle 3 effects a relatively very short and rigid construction of the slow speed portion of the feed train and makes unnecessary the transmission of slow motion with attendant high pressures, through the joint shafts.

A pocket 27 is provided in the housing 7 for the purpose of enclosing the gears of the rate changer, a cover 28 being removable to provide access to the gears. The rate changer here shown is of comparatively simple form. A great variety of other forms are well known and may be readily applied for the purpose either in the connecting train between the drive member 9 and the clutch member 26a or in the drive train between power source and the drive member 9, the purpose being to provide the clutch member 26a with a variety of feed rates which may be predetermined in the operation of the machine.

Figure 3:
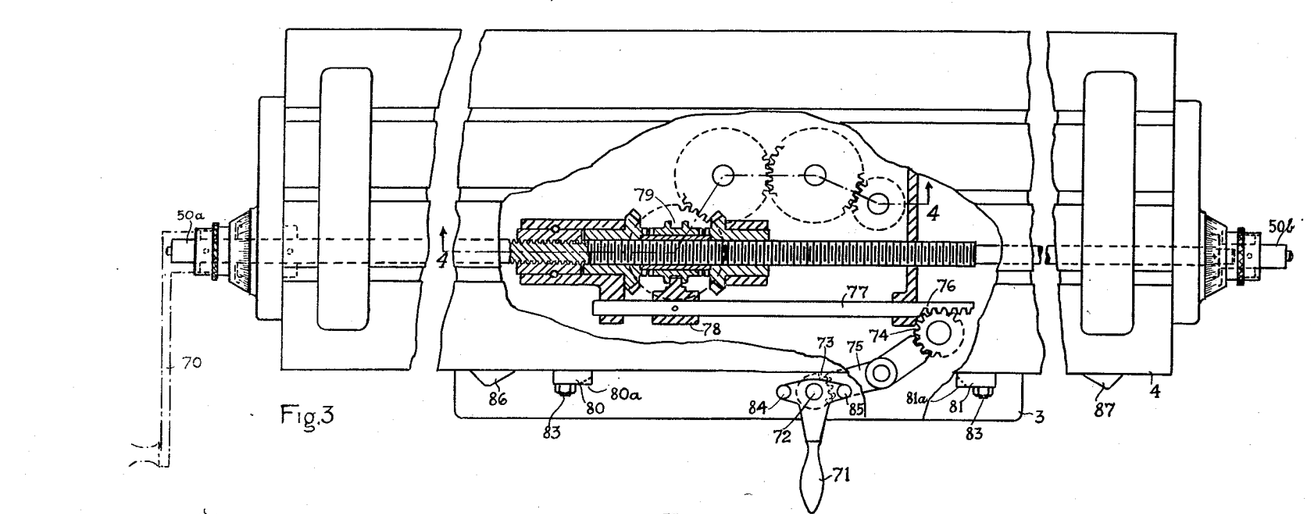
Fig. 3 is a top or plan view of the table and saddle, partly in section along line 3—3 of Fig. 4.
Figure 4:
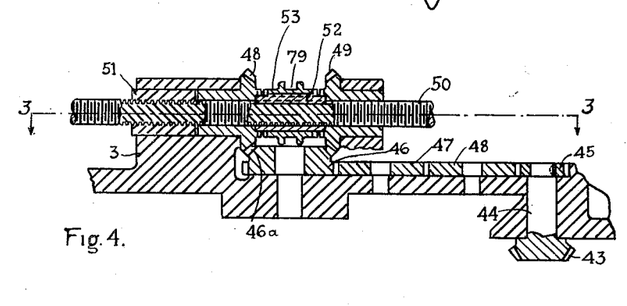
Fig. 4 is a partial vertical section developed along line 4—4 of Fig. 3.
Figure 5:
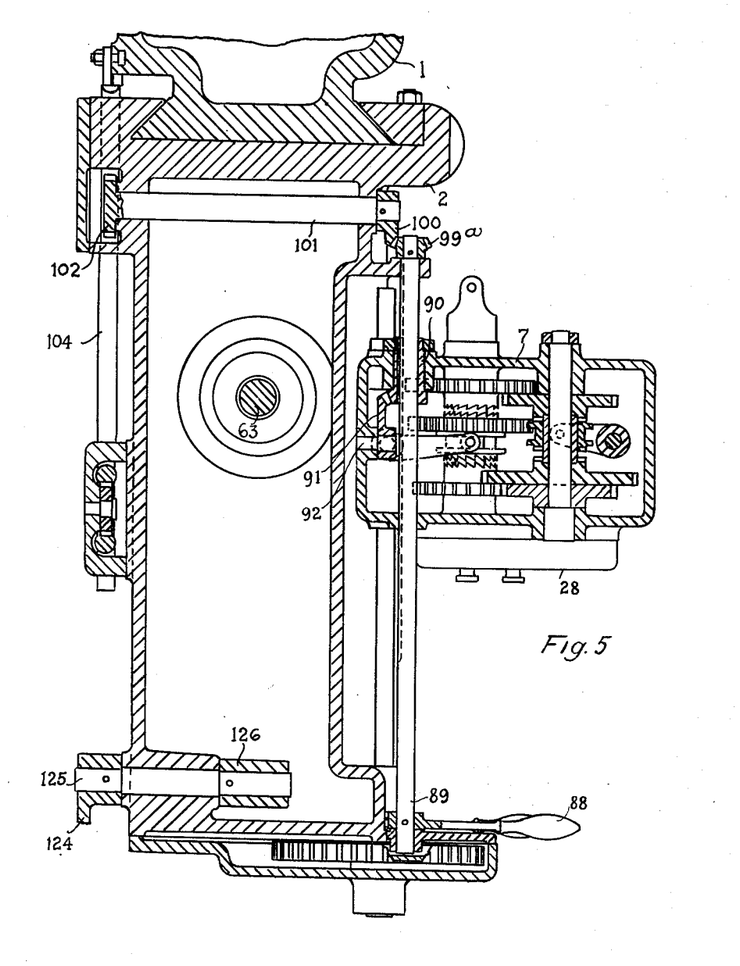
Fig. 5 is a horizontal section along line 5—5 of Fig. 1 and line 5—5 of Fig. 7.
Figure 10:
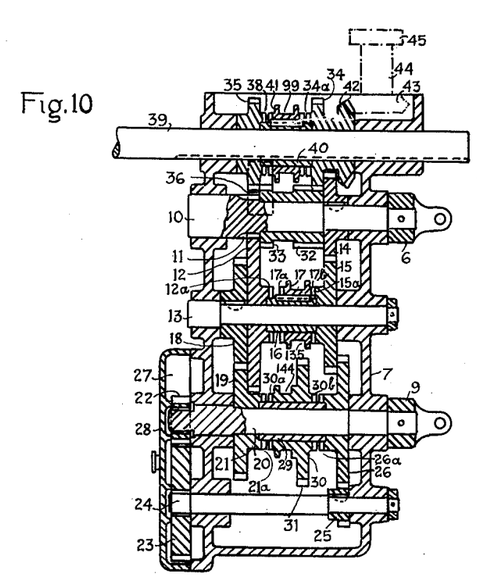
Fig. 10 is a developed section along line 10—10 of Fig. 7.

Supported by but rotatable on shaft 20 is a sleeve 29 to which is slidably keyed a clutch member 30 provided with clutch teeth 30a and 30b upon its opposite ends. The rapid traverse clutch member 21 and the feed clutch member 26a are provided upon their end faces with clutch teeth complementary to the clutch teeth of the clutch member 30 which may be shifted in the one or the other direction to be driven at a rapid traverse or feed rate from the one or the other of the members. The member 30 normally is positioned for feed engagement but when shifted for quick traverse engagement the quick traverse train causes the driven parts to overrun the feed train. Thus for quick traverse purposes, the member 30 and associated parts may be described as an overrunning device. Fixed upon clutch member 30 is a gear 31 in driving engagement with a gear 32 supported by but rotatable on the shaft 10 and having gear 33 fixed for rotation therewith. The gears are shown in Fig. 10, which being a developed section does not show gears 31 and 32 in mesh. From Fig. 7 it will be apparent that the gears are meshed when the shafts 10 and 20 are in their true relation. The gear 32 meshes with a gear 34 and fixed for rotation with gear 34 is a bevel gear 42 meshing with bevel gear 43 on short shaft 44 upon the other end of which is fixed a gear 45, see Figs. 3, 4, and 10. Gear 45 drives gear 46 through idlers 47 and 48. Fixed with the gear 46 is a bevel gear 46a engaging with oppositely disposed bevel gears 48 and 49 which are thus rotated in the opposite directions. Passing through suitable bores in the shanks of the bevel gears 48 and 49 is a table screw 50 rotatably supported from but fixed against axial movement relative to table 4. The table screw 50 is in threaded engagement with a nut 51 fixed in saddle 3 whereby when the screw is rotated it is given axial movement and the table is thereby moved in the one or the other direction according to the direction of rotation of the screw 50. Slidably keyed on the screw 50 intermediate the bevel gears 48 and 49 is a sleeve 52 to which is slidably keyed clutch member 53 provided at its opposite ends with clutch teeth. The faces of bevel gears 48 and 49 are provided with clutch teeth complementary to the clutch teeth on the clutch member 53 and adapted to be engaged thereby as clutch member is moved in the one or the other direction whereupon the screw 50 will be rotated in the one or the other direction in accordance with such movement.

Figure 7:
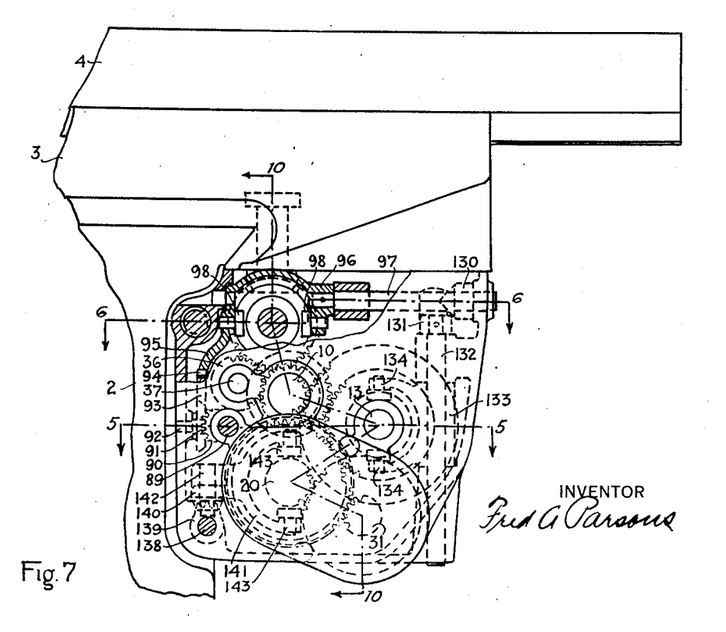
Fig. 7 is a front view partly in section of a box or housing fixed on the movable saddle as shown in Fig. 1, together with some of the associated parts.
Figure 8:
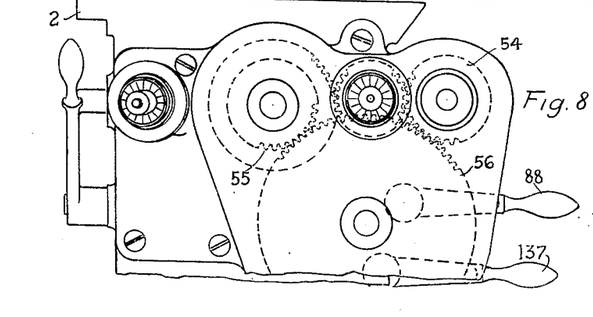
Fig. 8 is a front view of the mechanism associated with the front of the knee.

The clutch member 53 together with associated parts constitute a table motion reverser and the drive train from the bevel gear 42 to the table 4 being individual to the table, the reverser is likewise individual to the table and only effective for the reversal of table movement. The gear 33 drives a gear 35 through an idler 36 as indicated by dotted lines in Fig. 10 and as shown in Fig. 7, the idler being mounted upon stud 37 fixed in the housing 7. The gear 34 is fixed with a clutch member 34a and gear 35 is fixed with a clutch member 38. By the mechanism described the clutch members 34a and 38 will revolve in opposite directions. The clutch members are supported by but rotatable on a shaft 39 having suitable bearings in the housing 7 in which the shaft is relatively slidable. A sleeve 40 intermediate between clutch members 34a and 38 is slidably keyed with the shaft 39, and slidably keyed with the sleeve 40 is a clutch member 41 having clutch teeth upon each of its ends, the clutch teeth of the respective ends being adapted to engage with complementary clutch teeth on the clutch members 38 and 34a as the member 41 is moved in the one or the other direction. Since the members 34 and 38 revolve in opposite directions the shaft 39 will be driven in the one or the other direction in accordance with the direction of engagement of the clutch member 41 which together with associated parts constitutes a knee and saddle motion reverser. The shaft 39 is supported for rotation but fixed against axial movement relative to the knee 2 as more particularly shown in Fig. 6. Fixed thereon is a gear 54 which drives a gear 55 through an idler 56, see Figs. 6 and 8. Gear 55 is fixed on a shaft 57 upon which is slidably keyed a gear 58.

The transmission mechanism extending from the gears 32 and 34 to the gear 58 constitutes a power train which is common to the saddle and knee and includes a reverser consisting of the clutch member 41 together with associated parts whereby the reverser is likewise common to the saddle and knee. I will now describe the transmission mechanism which is individual to the saddle and the knee.

Figures 6, 11:
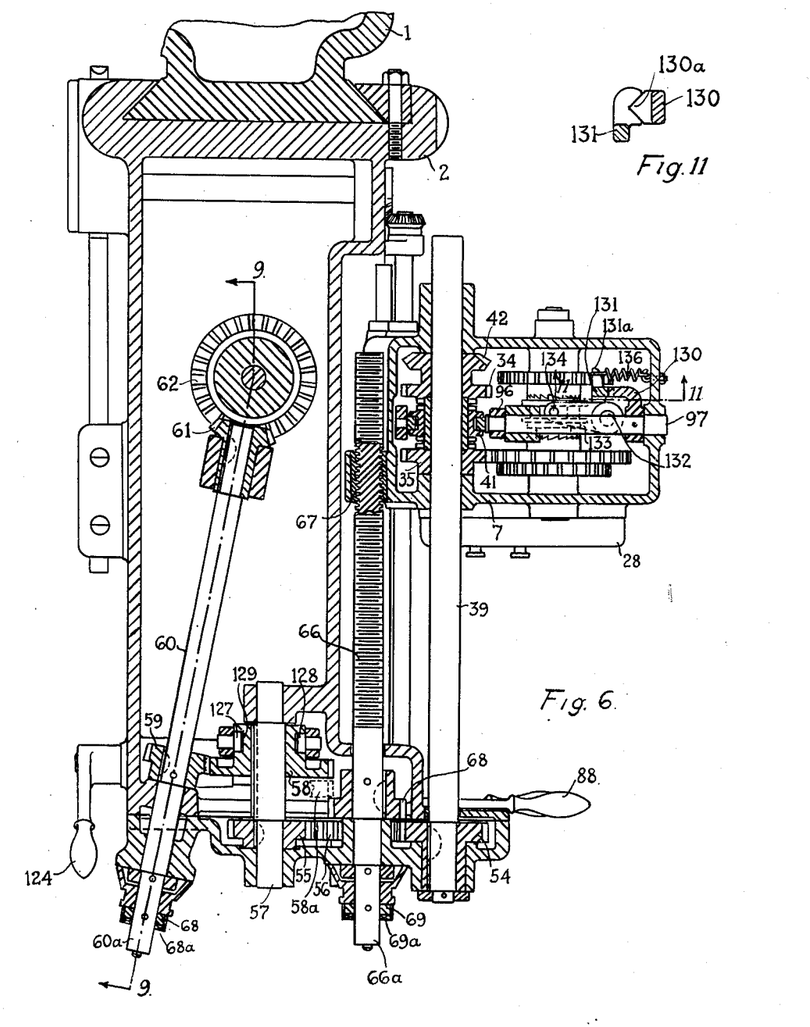
Fig. 6 is a horizontal section approximately along line 6—6 of Fig. 1, a portion being more specifically described as a section along line 6—6 of Fig. 7.
Fig. 11 is a front view of a portion of the mechanism in the box or housing as will be explained.
Figure 9:
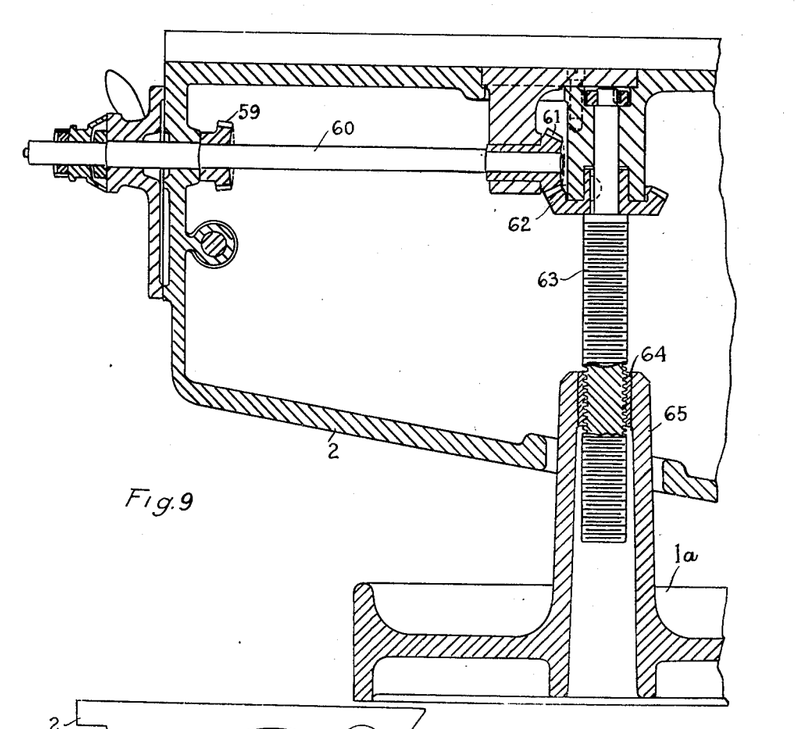
Fig. 9 is a vertical section along 9—9 of Fig. 6.

Angular gear 59 fixed on a shaft 60, see Fig. 6, may be engaged by gear 58 in the one position thereof. Fixed on shaft 60 is bevel gear 61 engaged with bevel gear 62, see Figs. 6 and 9, which is fixed for rotation with a knee or vertical screw 63 in threaded engagement with nut 64 fixed in an upward extension or stump 65 on a base portion 1a of column 1 which extends under the knee for this purpose. Thus when gear 59 is engaged by gear 58, the knee will be moved up or down in accordance with the position of the previously described saddle and knee reverser.

A cross feed screw 66 (see Fig. 6) is rotatably supported but fixed against axial movement relative to the knee 2 and is in threaded engagement with a nut 67 fixed in the housing 7 which in turn is fixed on saddle 3. Fixed on screw 66 is a gear 68 which may be engaged by gear 58 in one of its positions of adjustment. When gears 68 and 58 are so engaged the screw 66 will be rotated in the one or other direction in accordance with the position of adjustment of the saddle and knee reverser.

It will thus be seen that in accordance with the position of gear 58, either the knee or saddle may be moved by power, the direction being determined by the knee and saddle reverser. The gear 58 has central or neutral position as indicated by the dotted lines 58a, Fig. 6, in which it is out of engagement both with gear 68 and gear 59 in which case neither the saddle or knee will be moved by power.

If the gear 58 is disengaged from the gear 59, the knee 2 may be manually moved by means of suitable hand crank applied to the end 60a of shaft 60, there being a member 68 fixed on the shaft end and provided with clutch teeth 68a adapted for engagement by the crank. If the gear 58 is disengaged from the gear 68 the saddle may be manually moved by means of a suitable hand crank applied to end 66a of screw 66 and by a member 69 fixed thereon and having clutch teeth 69a adapted for engagement with the crank. If the table reverser clutch member is in its central or neutral position, the table may be manually moved by the means of hand crank 70 adapted to be applied to either of the projecting ends 60a or 50b of the table screw and by a suitable clutch or knee member adapted for movement of the screw from crank 70 in the usual manner.

For manual movement of the table reverser clutch member 53 the following means are provided. A hand lever 71 is pivoted for oscillation in the saddle 3 by means of a shank 72 which is provided with gear teeth 73. A pivoted gear 74 may be moved therefrom by means of pivoted lever 75 having gear teeth engaging both with gear teeth 73 and the gear 74. Gear 74 engages with rack teeth 76 on rod 77 slidably supported in the saddle 3 and having fixed thereon a fork 78 engaging with a spool or annular groove 79 in the clutch member 53. By the means described, the clutch member 53 may be manually moved to the one or the other position of engagement or to a central or neutral non-power transmitting position according to the movement of the hand lever 71.

The power movement of table 4 may be tripped or interrupted by the means of adjustable table dogs 80 and 81, the table being provided with a T slot 82 in which T bolts 83 engage for the adjustment of dogs 80 and 81 in the usual manner. Fixed on the lever 71 are upwardly projecting pins 84 and 85. The arrangement of the parts is such that when lever 71 is moved to engage clutch member 53 for power movement of the table one of the pins 84 or 85 will be moved into the path of movement of one of the dogs 80 or 81. The dogs are provided with bevel faces 80a and 81a adapted to contact the pin and move it back to position corresponding to the central or neutral position of the clutch member 53, whereupon the table will stop. Fixed to the table 4 are positive stop dogs 86 and 87 provided with angular surfaces adapted to contact with the pins 84 and 85, the relationship of the parts being such that the one or the other of the dogs 86 or 87 will contact with the pin before the table has moved to the limit of its travel, whereby table movement will be stopped before damage can result to the mechanism.

For the manual movement of the knee and saddle reverser clutch member 41, a hand lever 88 is fixed on a shaft 89 extending through suitable openings in the housings 7 to engage with the shank of bevel segment 90 pivoted in the housing and slidably keyed with the shaft. The bevel segment 90 engages with a bevel segment 91 pivoted on a stud 92 fixed in the housing and having an arm 93 (see Fig. 7) provided with gear teeth 94 adapted for engaging with suitable gear teeth on arm 95 of lever 96 fixed on a shaft 97 pivoted in housing 7. The lever 96 is provided with pivoted shoe 98 engaging with spool 99 of the clutch member 41.

By the mechanism described the movement of hand lever 88 will engage clutch member 41 to be driven from the one or the other gears 34 or 38 or position it centrally out of engagement with either of them.

Since either the knee or saddle may be moved from the engagement of the clutch member 41, means are provided whereby clutch member 41 may be returned to a neutral positon to trip or interrupt such movement from the movement either of the knee or saddle. The rod 89 is extended rearwardly and provided with a bevel gear 99a fixed thereon and meshed with bevel segment 100 fixed on shaft 101 upon the opposite end of which is a gear 102 fixed upon or integral with the shaft. Gear 102 engages with suitable rack teeth 103 in a rod or plunger 104 and similarly engages with rod or plunger 105. By the mechanism disclosed when hand lever 88 is shifted to engage clutch member 41, the ends of the one or the other of the plungers 104, 105, will be thrust forward into the path of relative movement of dogs 106 and 107 adjustably fixed on column 1. The dogs and plunger ends are provided with complementary beveled faces as more particularly shown in Fig. 2, and during movement of knee 2, the bevel faces of the one or the other of the dogs will eventually contact with one or the other of the plunger ends and thrust the plunger back and through the motion transmitting connections above described move clutch member 41 to a central or neutral position to interrupt the power movement of the knee. The dogs 106 and 107 are adjustable in T slot 108 by means of T bolts 109 in the usual manner whereby such trip action may be caused to take place at any desired point in the movement of knee 2. Fixed in the column 1 are positive dogs or stop pins 110 and 111 so disposed that they will contact with the bevel faces of the plungers 104 and 105 before the knee 2 has reached the limit of its movement in either direction, thereby interrupting the knee movement before damage can result to the mechanism.

Figure 2:
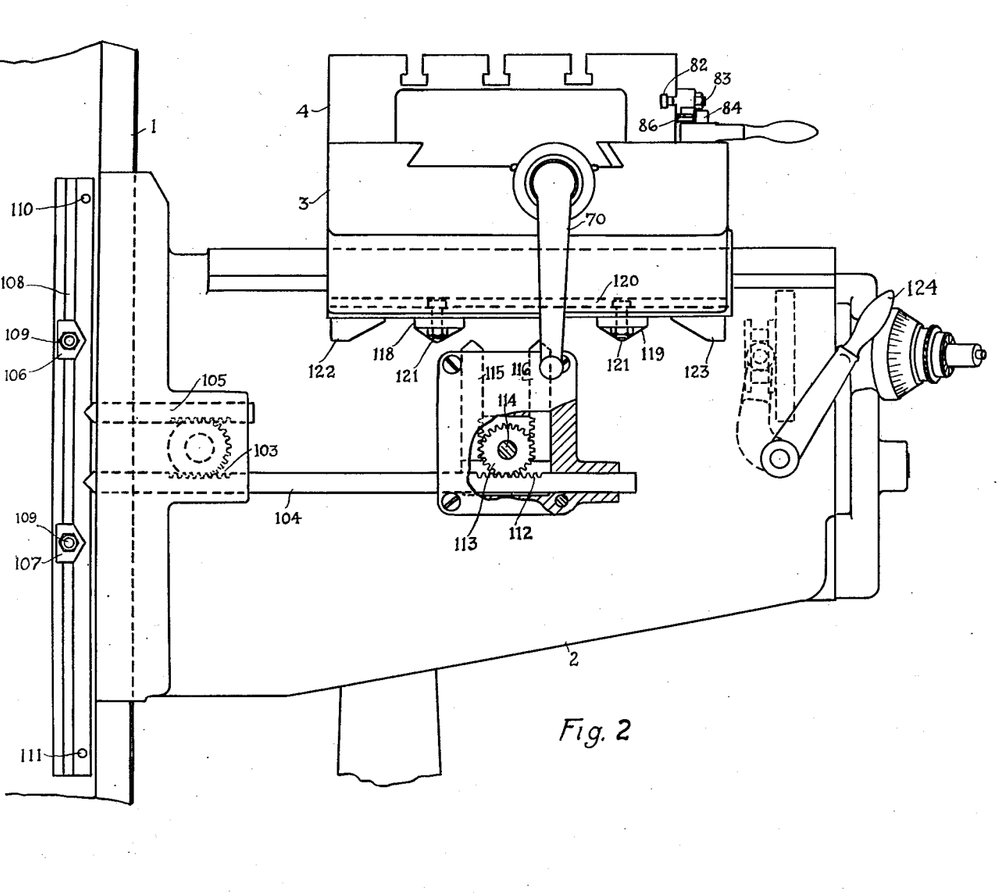
Fig. 2 shows a left view of the mechanism shown in Fig. 1.

The plunger 104 is extended to engage by means of suitable rack teeth 112 with gear 113 pivoted on stud 114, the gear being engaged with suitable rack teeth in plungers 115 and 116. The arrangement of the mechanism is such that as hand lever 88 is moved in one or the other direction for the engagement of clutch member 41, the one or the other of plungers 115 or 116 will be moved upwardly into the path of movement of dogs 118 or 119 adjustably fixed on saddle 3 by means of T slot 120, and T bolts 121 in the usual manner. The dogs and plunger ends are provided with complementary bevel surfaces as shown in Fig. 2 and the dogs 118 or 119 may be positioned to engage the plungers at any desired point in the saddle movement, whereupon the dog will force contacted plunger back into position corresponding to the neutral or central position of clutch member 41, thus tripping or interrupting movement of the saddle 3. Fixed with saddle 3 are positive stop dogs 122 and 123 provided with beveled surfaces as shown, arranged to contact with either one or the other of the plungers 115 and 116 during movement of the saddle before the saddle has reached the limit of movement in either direction, thus tripping or interrupting the saddle movement before damage can result to the mechanism.

For the movement of the gear 58 to engage with gear 68 or with gear 59 or to neutral position out of engagement with either of the gears, hand lever 124 is provided. Hand lever 124 is fixed on shaft 125 pivoted in knee 3 upon the opposite end of which is fixed a lever 126 having pivoted shoes 127, 128 engaging with spool or annular groove 129 in the extended shank of gear 58.

It is contemplated that the clutch member 17 may be moved by an individual lever if desired, but for various reasons it is here preferred that the movement of the hand lever 88 whereby clutch member 41 is moved should also bring about movement of the clutch member 17. Clutch member 17 when moved to engage clutch member 15a is productive of a comparatively fast rapid traverse and when moved to engage clutch member 12a, is productive of a comparatively slow rapid traverse. When clutch member 41 is moved in either direction, it may or may not be productive of movement of the knee or saddle in accordance with the movement or position of the gear 58, but in any case it is desirable that if the knee or saddle is to be moved only the slow rapid traverse should be available for their movement. The reason for this in the case of the knee resides in the heavy weight to be raised when the knee is moved upwardly, also because of the great amount of inertia of the knee and the parts supported thereon, it is difficult to stop when it has been started downwardly at a high rapid traverse rate. In the case of the saddle, a comparatively slow rapid traverse rate is desirable for the reason that the saddle movement is comparatively short. There is therefore no necessity for a fast rapid traverse movement for the knee or saddle and it is further undesirable because the operator, owing to the comparatively short distance to be moved, might become confused if the rate were too rapid and damage the machine, work or tools. For the above and various other reasons, it is preferable that at all times when the knee and saddle are available for power movement, the clutch member 17 should be engaged with the clutch member 12a to be productive only of a relatively slow rapid traverse rate. This might have been accomplished by an interlock preventing engagement of the clutch member 41 except when clutch member 17 was in a certain position, or by an interconnection between the gear 58 and clutch member 17 preventing engagement of the gear 58 with either the gear 59 or gear 68 except when the clutch member 17 was engaged with clutch member 12a and such means are contemplated as an equivalent of the construction described below. The method of control last mentioned is diagrammatically shown in Fig. 14 and is fully the equivalent to the method later described in preventing fast quick traverse movements for the knee and saddle while permitting fast quick traverse for the table, but it has here been considered preferable for various reasons to provide means whereby clutch member 17 is moved into engagement with the clutch member 12a whenever the clutch member 41 is shifted in either direction and is returned to engagement with the clutch member 15a whenever the clutch member 41 is returned to a neutral or non-driving position, whereby the fast rapid traverse rate is available for the movement of the table at all times except when the clutch member 41 is in a position to produce movement of the knee or saddle. This method of control is illustrated in the diagram Fig. 14 and is accomplished as follows:

On the extended shaft 97 is fixed lever 130 (see Figs. 6, 7, 11). Lever 130 is provided with a point or cam 130a engaging with complementary notch or cam in a lever 131 fixed on a shaft 132 pivoted in the housing 7. Also fixed on the shaft 132 is a fork 133 provided with pivoted shoes 134 engaging with a spool or annular groove 135 in the clutch member 17. The lever 131 is provided with a lug 131a engaged by a spring 136 reacting against the lever to swing shaft 132 in a direction to engage the clutch member 17 with the fast rapid traverse clutch member 15a unless otherwise prevented. The relationship of the parts is such that the cam point 130a and the complementary notch permit such engagement with the clutch member 15a except when clutch member 41 is shifted in the one or the other direction. In such case, the notch reacts with the cam point to swing lever 130 together with the shaft 132 and fork 133 in a direction to engage clutch member 17 with the clutch member 12a and this will occur in either direction of the movement of clutch member 41. It will be noted that the movement of engagement of the clutch member 17 is positive only when engaging with the clutch member 12a and that this is brought about only by movement of the hand lever 88 and not by power. When clutch member 41 is to be tripped out of engagement by power by means of dogs previously described, the movement of the clutch member 17 is impositive, being brought about by spring 136.

For rapid traverse movement of the table, the fast rapid traverse is ordinarily preferable but it will be noted that by connecting the clutch member 17 for movement with the clutch member 41 instead of with the gear 58, which as previously noted might have been done, it is possible to operate the table at the slow rapid traverse rate without at the same time bringing about movement of either the knee or saddle when conditions of operation make this desirable. To accomplish this the clutch member 41 is set to remain in either position of engagement whereby the clutch member 17 is positioned in engagement with the clutch member 12a, the gear 58 being positioned in its central or neutral position 58a out of engagement with either the gear 59 or 68 if it is desired to prevent movement of the knee or saddle. Such position of the clutch member 41 has no effect upon the direction of movement of table 4, this being controlled as before by movement of the clutch member 53 but the slow rapid traverse is thereby rendered effective upon the table whenever clutch member 30 is shifted to engage rapid traverse clutch member 21.

For the manual movement of the clutch member 30, the following means are provided. Hand lever 137 is fixed on a shaft 138 which is fixed against axial movement relative to the knee 2 and is slidably supported in the housing 7, (see Figs. 1 and 7). Bevel gear segment 139 rotatably supported in the housing 7 is slidably keyed with the shaft 138 and engages arm 140 of a lever 141, the arm 140 being provided with bevel gear teeth meshing with the gear teeth of the segment 139, and lever 141 being pivoted on a stud 142. Lever 141 is provided with pivoted shoes 143 engaging with spool or annular groove 144 in the clutch member 30. The arrangement of the parts is such that the movement of the hand lever 137 in one or the other direction will engage clutch member 30 with the feed clutch member 26a or with rapid traverse clutch member 19.

Various modified but equivalent constructions may be made in the light of the above disclosure, each of which are within the spirit and scope of the invention as defined in the following claims.

I claim:

1. In a machine tool having a plurality of movable supports the combination of a plurality of clutch members, a driving connection for one of said clutch members including a feed rate changer, a driving connection for the other of said members including a device selectively shiftable to produce two rapid traverse rates, clutch means shiftable to connect with the one or the other of said members, and transmission mechanism connectible from said clutch means to each of said supports.

2. In a machine tool having a movable support, the combination of a first clutch member and a second clutch member respectively driven at a fast and slow rapid traverse rate, a first clutch means alternatively shiftable to engage said first of second member, a third clutch member connected to be driven from said clutch means, a fourth clutch member connected to be driven at a feed rate, a second clutch means alternatively shiftable to engage said third or fourth clutch members, and a power train connectible from said second clutch means to said support.

3. In a machine tool having a plurality of supports the combination of transmission mechanism therefor including a member shiftable to produce a fast or slow rate and also including an element shiftable to interrupt or to establish movement of one of the supports, a dog and a trip part positioned for contact during the movement of the last named support, a hand lever, and motion transmitting connections to said member and to said element both from said trip part and from said hand lever.

4. In a machine tool having a plurality of movable supports the combination of transmission mechanism therefor including a member shiftable in opposite directions to produce a fast or a slow rate and an element shiftable to establish or to interrupt movement of one of said supports, a trip part connected for positive movement with said element, a dog adapted to contact said trip part during the movement of the last named support, and motion transmitting connections including spring operated means connecting said member and said element, whereby said member is impositively shifted whenever said element is shifted from said dog.

5. In a machine tool having a plurality of movable supports the combination of transmission mechanism therefor including a member shiftable to produce a fast or a slow rate and an element shiftable to interrupt or to establish movement of one of said supports, and a dog operated trip device in part bodily movable with the last named support and having motion transmitting connections for shifting said element for the interruption of support movement and for the shifting of said member to a fast rate position whenever said element is so shifted.

6. In a machine tool having three movable supports the combination of a plurality of clutch elements, drive means for one of said elements including a feed rate changer, drive means for the other element including a part shiftable for operation at different rapid traverse rates, clutch means shiftable to engage with either of said said clutch elements, a power train connecting said clutch means with one of said supports including a reverser, and a drive train connectible for the operation of each of the other supports and connected with said power train at a point between said clutch means and said reverser, said drive train including a reverser.

7. In a machine tool having a plurality of movable supports, the combination of transmission mechanism therefor including a clutch member shiftable to two positions respectively for actuation at different rates and a power train connectible from said member to one of said supports through an element shiftable to two positions respectively effective to interrupt or to establish the movement of the last named support, a motion transmitting connection from said element to said member including cam means operative to shift said member to a certain position whenever said element is shifted to a certain position, and spring means operative to shift said member to its other position whenever said element is shifted to its other position.

8. In a machine tool having a plurality of movable supports, the combination of transmission mechanism therefor including a clutch member shiftable to two positions respectively for actuation at different rates and a power train connectible from said member to one of said supports through a reverser element shiftable to a first and second position respectively establishing forward and back movement of the last named support and to a third position interrupting movement of the last named support, a motion transmitting connection from said element to said member including cam means operative to shift said member to a certain position whenever said element is shifted to either of said first or second positions, and spring means operative to shift said member to its other position whenever said element is shifted to its third position.

9. In a milling machine, the combination of a plurality of movable supports, transmission mechanism for movement of said supports including a relatively slow feed train and a relatively fast rapid traverse train, a member alternatively operable from the one or the other of said trains, and mechanism operable for selective actuation of said supports from said member, said quick traverse train including a portion shiftable to effect different quick traverse rates, and control mechanism for said transmission mechanism including means positively preventing the actuation of one of said supports at one of said quick traverse rates.

10. In a milling machine the combination of a plurality of movable supports, a relatively slow feed train including a rate changer, a relatively fast quick traverse train including a device operable for two quick traverse rates, a transmission member selectively operable from the one or the other of said trains, a first transmission for connecting one of said supports with said member and including a reverser, a second transmission for connecting the other of said supports with said member and also including a reverser, and control mechanism including separately operable devices respectively for different of said reversers and means preventing operation of one of said supports at one of said quick traverse rates.

11. In a milling machine, the combination of three movable supports, a relatively slow feed train including a feed rate changer, a relatively fast rapid traverse train including a device operable for two quick traverse rates, a member selectively operable from the one or the other of said trains, a first transmission for connecting said member with one of said supports and including a reverser, a second transmission including a reverser and selectively operable for actuating either of the other of said supports, and control mechanism including separately operable devices respectively for different of said reversers and means preventing operation of said second transmission at one of said quick traverse rates.

12. In a milling machine, the combination of a plurality of movable supports, transmission mechanism for movement of said supports including a relatively slow feed mechanism including a rate changer, a relatively fast rapid traverse mechanism having a portion alternatively operable to effect the one or the other of different rates of rapid traverse and mechanism adapted to transmit motion to either of said supports from either of said trains; and control mechanism including means selective of the one or the other of said supports to be moved from said transmission mechanism and including means preventing actuation of one of said supports at one of said quick traverse rates.

13. In a milling machine the combination of a plurality of movable supports, a relatively slow feed mechanism including a rate changer, a relatively fast quick traverse mechanism including a device operative for two quick traverse rates, a train for connecting a selected one of said mechanisms with one of said supports and including a reverser, a second train for connecting a selected one of said mechanisms with the other support and including a second reverser, and control mechanism including separately operable devices respectively for different of said reversers, and means preventing operation of one of said supports at one of said quick traverse rates.

14. In a milling machine the combination of three movable supports, a relatively slow feed mechanism including a rate changer, a relatively fast quick traverse mechanism including a device operable for two quick traverse rates, a first transmission for connecting a selected one of said mechanisms with one of said supports and including a reverser, another transmission operable from a selected one of said mechanisms and including a second reverser and selectively operable for actuating either of the other of said supports, and control mechanism including separately operable devices respectively for different of said reversers and including means preventing operation of said other transmission at one of said quick traverse rates.

15. In a milling machine the combination of a plurality of movable supports, a relatively slow feed mechanism including a rate changer, a relatively fast quick traverse mechanism including a device operative for two quick traverse rates, a train for connecting a selected one of said mechanisms with one of said supports and including a reverser, a second train for connecting a selected one of said mechanisms with the other support and including a second reverser, control mechanism selective of the one or the other of said supports to be actuated through different of said reversers respectively, and means operative in accordance with said selection of one of said supports to prevent operation thereof at one of said quick traverse rates.

16. In a milling machine the combination of a plurality of movable supports, a relatively slow feed mechanism including a rate changer, a relatively fast quick traverse mechanism including a device operative for two quick traverse rates, a train for connecting a selected one of said mechanisms with one of said supports and including a reverser, a second train for connecting a selected one of said mechanisms with the other support and including a second reverser, and control mechanism including a plurality of hand operable levers respectively having motion transmitting connection with different of said reversers, one of said hand levers having a motion transmitting connection operative on said device to determine the one or the other of said quick traverse rates.

17. In a milling machine the combination of a bodily movable support, a work support reciprocably movable thereon, transmission mechanism alternatively effective for feed or quick traverse rates and including a quick traverse device operable for different quick traverse rates and supported for movement with said bodily movable support, said transmission being connectible with each of said supports for movement thereof, and control mechanism supported for movement with said bodily movable support and operative to prevent movement of one of said supports at one of said quick traverse rates.

18. In a milling machine the combination of a bodily movable support, a work support reciprocably movable thereon, transmission mechanism alternatively effective for feed or quick traverse rates including a feed rate changer and a quick traverse device, each supported for movement with said bodily movable support, said quick traverse device being operable for different quick traverse rates, said transmission being connectible with each of said supports for movement thereof, and control mechanism supported for movement with said bodily movable support and operative to prevent movement of one of said supports at one of said quick traverse rates.

19. In a milling machine the combination of a vertically movable knee member, a saddle member supported on said knee member for cross movement, a table member supported on said saddle member for longitudinal movement, transmission mechanism operable for movement of a plurality of said members and alternatively operable for feed or quick traverse rates, said mechanism including a feed rate changer supported for bodily movement with said knee member, and control mechanism for said transmission including a first control means supported for bodily movement with said knee and determinative of feed or quick traverse rate for one of said members and a second control means supported for bodily movement with said knee and individually determinative of the direction of movement of one of said members, said transmission and control mechanism being operative to effect a substantially reduced quick traverse rate for one of said members relative to the quick traverse rate of another of said members.

20. In a milling machine, the combination of a column, a plurality of work supports including a knee vertically movable on said column, a saddle slidably supported on said knee for horizontal movement and a table movably supported on said saddle, said supports together providing movement of said table in three paths transverse to one another, transmission mechanism for table movement including a feed rate train and a quick traverse rate train, and mechanism operative to actuate said table in a plurality of said paths from each of said trains, and control mechanism including a reverser individually selective of the direction of movement in one of said paths, said transmission and control mechanism being operative for table movement in the last mentioned path from said quick traverse train element at a materially different rate than the table movement derived from said quick traverse train in another of said paths.

21. In a milling machine, the combination of a column, a work table supported from said column for bodily movement in three paths transverse to one another, and transmission and control mechanism for movement of said table including a feed rate train providing a feed rate changer, a quick traverse train, a first branch line for table movement in one of said paths and providing a reverser, and a second branch line for table movement in another of said paths and providing a second reverser, each of said branch lines being alternatively operable from either of said trains, said transmission and control mechanism providing means effective for materially different rates of table quick traverse movement in the respective paths of movement associated with the respective branch lines.

22. In a milling machine, the combination with a work supporting table, a saddle and a knee, of a feed transmission for the table, saddle and knee comprising a main feed shaft, a variable speed mechanism for driving the shaft, a two speed quick traverse mechanism for driving the shaft ahead of the variable speed mechanism at either of two relatively rapid rates, branch transmissions for driving the table, saddle and knee from the main feed shaft, and means for locking the higher speed quick traverse mechanism out of operation while the main feed shaft is operatively connected to the saddle or knee.

23. In a milling machine, the combination with a work supporting table, a saddle and a knee, of a feed transmission for the table, saddle and knee comprising a main feed shaft, a variable speed mechanism for driving the shaft, a two speed quick traverse mechanism for driving the shaft ahead of the variable speed mechanism at either of two relatively rapid rates, branch transmissions for driving the table, saddle and knee from the main feed shaft, and means for locking the feed transmissions for the saddle and knee out of operation while the main feed shaft is being driven at the higher of the quick traverse speeds.

24. In a milling machine, the combination with a work supporting table, a saddle and a knee, of a feed transmission for the table, saddle and knee comprising a main feed shaft, a two speed quick traverse mechanism for driving the shaft, branch transmissions for driving the table, saddle and knee from the main feed shaft, and means for locking the higher speed quick traverse mechanism out of operation while the main feed shaft is operatively connected to the saddle or knee.

25. In a milling machine, the combination with a work supporting table, a saddle and knee, of a feed transmission comprising a main feed shaft, branch transmissions for driving the table, saddle and knee from the main feed shaft, clutches for disconnecting the saddle and knee feeds from the main feed shaft, a two speed quick traverse mechanism for driving the main feed shaft at either of two relatively higher rates, controlling members for the saddle and knee clutches and the quick traverse mechanism, and interlocking connections between said member arranged to lock the higher speed quick traverse mechanism out of operation while the saddle or knee is connected to the main feed shaft, and to prevent the connection of the saddle or knee to said shaft while the higher speed quick traverse mechanism is in operation.

26. In a milling machine providing a rotary spindle the combination with a work supporting table, a saddle, and a support cooperating with these parts movable to vary the distance between the spindle and the work supporting table, of a feed transmission for the table, saddle and support comprising a main feed shaft, a variable speed mechanism for driving the shaft, a two speed quick traverse mechanism for driving the shaft ahead of the variable speed mechanism at either of two relatively rapid rates, branch transmissions for driving the table, saddle, and support from the main feed shaft, and means for locking the higher speed quick traverse mechanism out of operation while the main feed shaft is operatively connected to the saddle or support.

27. In a milling machine providing a rotary spindle the combination with a work supporting table, a saddle, and a support cooperating with these parts movable to vary the distance between the spindle and the work supporting table, of a feed transmission for the table, saddle and support comprising a main feed shaft, a variable speed mechanism for driving the shaft, a two speed quick traverse mechanism for driving the shaft ahead of the variable speed mechanism at either of two relatively rapid rates, branch transmissions for driving the table, saddle and support from the main feed shaft, and means for locking the feed transmissions for the saddle and support out of operation while the main feed shaft is being driven at the higher of the quick traverse speeds.

28. In a milling machine providing a rotary spindle the combination with a work supporting table, a saddle, and a support cooperating with these parts adjustable to vary the distance between the spindle and the work supporting table, of a feed transmission for the table, saddle and support comprising a main feed shaft, a two speed quick traverse mechanism for driving the shaft, branch transmissions for driving the table, saddle and support from the main feed shaft, and means for locking the higher speed quick traverse mechanism out of operation while the main feed shaft is operatively connected to the said saddle or support.

29. In a milling machine providing a rotary spindle the combination with a work supporting table, a saddle, and a support cooperating with these parts movable to vary the distance between the spindle and the work supporting table, of a feed transmission for the table, saddle and support comprising a main feed shaft, a variable speed mechanism for driving the shaft, a quick traverse mechanism for driving the shaft ahead of the variable speed mechanism, a two speed clutch for the quick traverse mechanism to drive the main feed shaft at either of two relatively rapid rates, and branch transmissions for driving each of the table, saddle and support from the main feed shaft.

30. In a milling machine providing a rotary spindle the combination with a work supporting table, a saddle, and a support cooperating with these parts adjustable to vary the distance between the spindle and the work supporting table, of a feed transmission comprising a main feed shaft, branch transmissions for driving the table, saddle and support from the main feed shaft, interconnected clutches for disconnecting the feeds for the saddle and support from the main feed shaft, a variable speed mechanism for driving the shaft, a two speed quick traverse mechanism for driving the main feed shaft at either of two relatively rapid rates, and means controlled by the position of the interconnected clutches to lock the high speed quick traverse mechanism out of operation during the operation of the feeds for said saddle and support.

31. In a milling machine providing a rotary spindle the combination with a work supporting table, a saddle, and a support cooperating with these parts adjustable to vary the distance between the spindle and the work supporting table, of a feed transmission comprising a main feed shaft, branch transmissions for driving the table, saddle, and support from the main feed shaft, clutches for disconnecting the feeds for the saddle and support from the main feed shaft, a two speed quick traverse mechanism for driving the main feed shaft at either of two relatively higher rates, controlling members for the saddle and support clutches and the quick traverse mechanism, and interlocking connections between said members arranged to lock the higher speed quick traverse mechanism out of operation while the saddle or support is connected to the main feed shaft, and to prevent the connection of the saddle or support to said shaft while the higher speed quick traverse mechanism is in operation.

32. In a milling machine, the combination with a work supporting table, a saddle and knee, of a feed transmission comprising a main feed shaft, branch transmissions for driving the table, saddle and knee from the main feed shaft, interconnected clutches for disconnecting the saddle and knee feeds from the main feed shaft, a variable speed mechanism for driving the shaft, a two speed quick traverse mechanism for driving the main feed shaft at either of two relatively rapid rates, and means controlled by the position of the interconnected clutches to lock the high speed quick traverse mechanism out of operation during the operation of the saddle and knee feeds.

FRED A. PARSONS.